Patented Mar. 13, 1928.

1,662,355

UNITED STATES PATENT OFFICE.

JAMES P. ANDREW, OF DETROIT, MICHIGAN, ASSIGNOR, BY MESNE ASSIGNMENTS, TO GENERAL MOTORS CORPORATION, OF DETROIT, MICHIGAN, A CORPORATION OF DELAWARE.

BROMINE RECOVERY.

No Drawing. Application filed October 22, 1925. Serial No. 64,208.

This invention relates to the recovery of bromine in relatively insoluble compounds from saline solutions, such, for example, as sea water. The object of the invention is to provide a process particularly adapted for treating large volumes of saline solutions containing bromine so as to recover a large part of the bromine content and avoid side reactions and hydrolysis which would materially affect the yield.

As one example of a method of carrying out my invention, when treating sea water such as is found in the Atlantic Ocean, containing .006% bromine in the form of soluble bromides, I may take for one ton of this sea water .6 of a pound of concentrated sulfuric acid, .1065 lbs. of chlorine and .072 lbs. of aniline sulfate. The acid and the chlorine are thoroughly mixed with the sea water and then the aniline sulfate is thoroughly mixed with this treated water, preferably in as short a time as possible. The reaction takes place without heating. The product of this reaction, tribromaniline, may be separated from the sea water by filtration, flotation, or other methods. Elemental bromine may be obtained from tribromaniline. In commercial work, I prefer to add the acid first and then the chlorine, but the order of these steps is not essential.

In the above example, I have employed substantially two atoms of chlorine to each atom of bromine present in the sea water. This apparently gives the maximum yield of tribromaniline. However, I may vary the proportion of chlorine from between one and two atoms to each atom of bromine to more than two atoms of chlorine to each atom of bromine. The acidifying of the mixture with sulphuric, hydrochloric or other strong mineral acids adds materially to the yield, the yield increasing as the acidity is increased even when several times the quantity of acid used in the example above is employed. However, the process may be employed without using any acid. In place of aniline sulfate I may use aniline hydrochloride, or other salts of aniline, or a compound reacting with bromine to give an insoluble compound.

In commercial work the acid, chlorine and aniline sulfate may be diluted as with sea water prior to mixing with the body of sea water being treated. Lowering the temperature of the mixture generally increases the yield.

This process lends itself to a continuous plant operation in which a large volume of sea water is passed continually through appropriate mixing devices and recovery devices, turbulence being created, if desired, to effect a homogeneous mixture of the saline solution under treatment.

What I claim is:

1. A process of recovering bromine from saline solutions, which comprises treating the solution with more than one atom of chlorine for each atom of bromine present in the solution, and forming with the bromine an insoluble bromine compound.

2. A process of recovering bromine from saline solutions, which comprises treating the solution with more than one atom of chlorine for each atom of bromine present in the solution, acidifying the solution and forming with the bromine an insoluble bromine compound.

3. A process of recovering bromine from saline solutions, which comprises treating the solution with substantially two atoms of chlorine for each atom of bromine present in the solution, and forming with the bromine an insoluble bromine compound.

4. A process of recovering bromine from saline solutions, which comprises treating the solution with substantially two atoms of chlorine for each atom of bromine present in the solution, acidifying the solution, and forming with the bromine an insoluble bromine compound.

5. A process of recovering bromine from saline solutions, which comprises treating the solution with more than one atom of chlorine for each atom of bromine present in the solution, and adding an aniline salt.

6. A process of recovering bromine from saline solutions, which comprises treating the solution with more than one atom of chlorine for each atom of bromine present in the solution, acidifying the solution, and adding an aniline salt.

7. A process of recovering bromine from saline solutions, which comprises treating the solution with substantially two atoms of chlorine for each atom of bromine present in the solution, and adding an aniline salt.

8. A process of recovering bromine from saline solutions, which comprises treating the solution with substantially two atoms of chlorine for each atom of bromine present in the solution, acidifying the solution, and adding an aniline salt.

9. A process of recovering bromine from saline solutions, which comprises treating the solution with substantially two atoms of chlorine for each atom of bromine present in the solution, acidifying the solution, adding an aniline salt, and removing the bromine compound from the saline solution.

In testimony whereof I hereto affix my signature.

JAMES P. ANDREW.